United States Patent
Nagai et al.

(10) Patent No.: US 7,049,679 B2
(45) Date of Patent: May 23, 2006

(54) CAPACITOR AND PRODUCTION METHOD THEREFOR

(75) Inventors: Atsuo Nagai, Osaka (JP); Hideki Kuramitsu, Osaka (JP); Emiko Igaki, Hyogo (JP); Koichi Kojima, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 31 days.

(21) Appl. No.: 10/432,894

(22) PCT Filed: Nov. 1, 2002

(86) PCT No.: PCT/JP02/11435

§ 371 (c)(1),
(2), (4) Date: Oct. 17, 2003

(87) PCT Pub. No.: WO03/041099

PCT Pub. Date: May 15, 2003

(65) Prior Publication Data

US 2004/0087102 A1    May 6, 2004

(30) Foreign Application Priority Data

Nov. 8, 2001 (JP) .............................. 2001-342901

(51) Int. Cl.
*H01L 29/72* (2006.01)

(52) U.S. Cl. .............. 257/532; 257/534; 257/632; 257/761; 257/763

(58) Field of Classification Search ........... 257/532, 257/534, 632, 761, 763, E21.324, E21.497, 257/68, 71, 516

See application file for complete search history.

(56) References Cited

U.S. PATENT DOCUMENTS

| | | | | |
|---|---|---|---|---|
| 3,581,159 A | * | 5/1971 | Piper et al. | 361/532 |
| 3,966,987 A | * | 6/1976 | Suzuki et al. | 252/500 |
| 4,067,736 A | * | 1/1978 | Vartanian | 420/425 |
| 4,648,010 A | * | 3/1987 | Naitoh et al. | 361/525 |
| 4,664,883 A | * | 5/1987 | Melody et al. | 419/2 |
| 4,864,472 A | * | 9/1989 | Yoshimura et al. | 361/525 |

FOREIGN PATENT DOCUMENTS

| | | |
|---|---|---|
| EP | 0 286 866 | 10/1988 |
| JP | 63-262833 | 10/1988 |
| JP | 2001-512530 | 8/2001 |

\* cited by examiner

*Primary Examiner*—George Fourson
*Assistant Examiner*—Joannie Adelle Garcia
(74) *Attorney, Agent, or Firm*—Wenderoth, Lind & Ponack, L.L.P.

(57) ABSTRACT

A solid electrolytic capacitor is obtained in which a sintered metal serves as an anode and a silver layer serves as a cathode. A surface of sintered metal made of tantalum or the like and having an open porosity ratio of more than 75% is oxidized so that an oxide film made of tantalum pentoxide or the like is deposited thereon. Cavities of the metal are filled with an electrically conductive material. Then, the metal is wound around a lead wire and made into a desired shape and size. The silver layer is formed on this porous metal body. Because a specific surface area of the sintered metal is large, a large capacity is obtained.

20 Claims, 3 Drawing Sheets

CAPACITOR AND PRODUCTION METHOD THEREFOR

This application is a National Stage application of PCT/JP02/11435, filed Nov. 1, 2002.

TECHNICAL FIELD

The present invention relates to a capacitor used in a variety of electronic devices such as personal computers, and a method of manufacturing the capacitor.

BACKGROUND ART

As an example of a conventional capacitor, a tantalum solid electrolytic capacitor is described below.

FIG. 3 is a cross-sectional view of the conventional tantalum solid electrolytic capacitor. A tantalum lead wire 1 and a sintered body 2 produced by sintering a mass of molded tantalum powder are joined together. A graphite layer 3 is formed on a surface of the sintered body 2, and a silver layer 4 is formed on an outer surface of the graphite layer 3. An electrode 5A is connected to the tantalum lead wire 1, and an electrode 5B is coupled to the silver layer 4. An electrode body thus produced is covered with a resin package 6.

A manufacturing method of the capacitor is demonstrated below.

First, mold a mass of tantalum powder placed around the lead wire 1 at high pressure, and sinter this molded powder to make the sintered body 2. Then, anode-oxidize the sintered body 2 in a phosphoric acid solution, and produce a dielectric film of tantalum pentoxide on a surface of the body 2 (not illustrated). Next, fill cavities of the sintered body 2 with a solid-electrolyte of manganese-dioxide or the like (not illustrated), and successively form the graphite layer 3 and the silver layer 4 on the surface of the sintered body 2. Finally, connect the electrode 5A and the electrode 5B to the tantalum lead wire 1 and the silver layer 4, respectively, and cover an outer surface of this electrode body with the resin package 6.

The manufacturing method of the sintered body 2 used in the capacitor is disclosed in Japanese Patent Laid-Open Application No. S63-262833, as an example. More specifically, the method includes steps of mixing camphor grains having a specified mean diameter with a metallic powder, press-molding this mixture and evaporating the camphor by heating. A porosity ratio of the sintered body is up to about 75%. Because a surface area of the dielectric film is small, a large capacity is hardly obtainable.

SUMMARY OF THE INVENTION

A capacitor of the present invention includes a sintered metal made of foam metal, and electrically conductive material which is placed on a surface of an oxide film of the sintered metal. The sintered metal has a skeleton of a solid construction and its porosity ratio is more than 75% but not more than 97%. A manufacturing method of the capacitor includes steps of forming the conductive material on the surface of the oxide film which is deposited on the sintered metal, and forming the sintered metal into a desired shape and size.

DETAILED DESCRIPTION OF PREFERRED EMBODIMENTS

First Exemplary Embodiment

Figure 1:
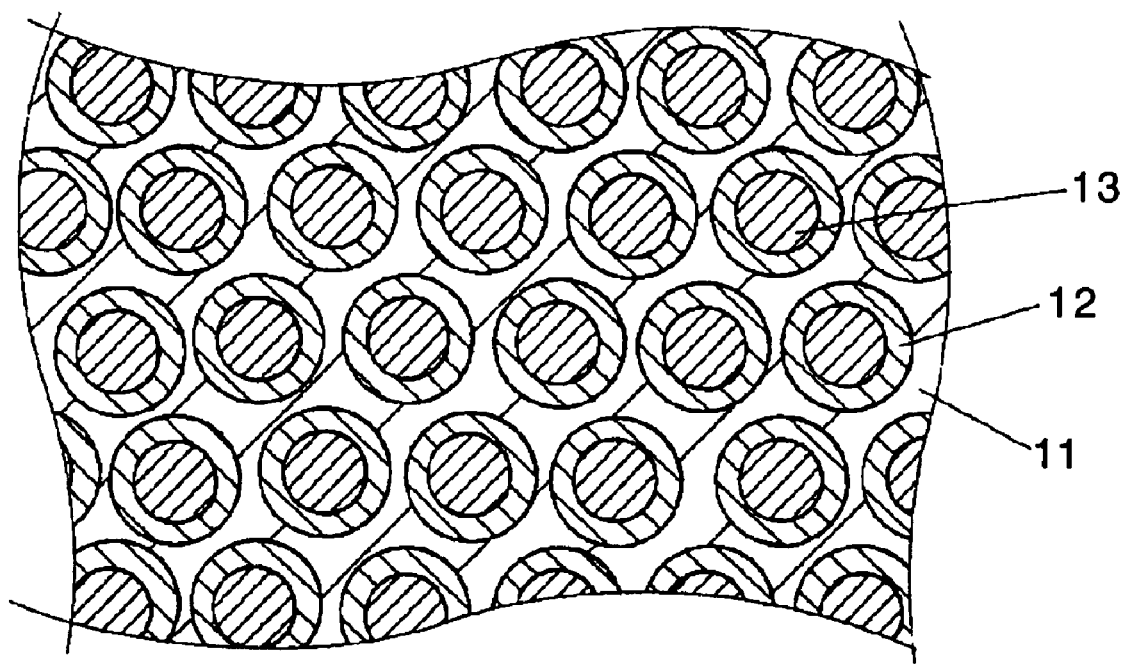
FIG. 1 is an ideational cross-sectional view of a porous body in accordance with a first and a second exemplary embodiment of the present invention.

FIG. 1 is an ideational cross-sectional view of a porous body in accordance with a first exemplary embodiment of the present invention. In FIG. 1, a sintered metal 11 is made of tantalum, which has a skeleton of a solid construction with a porosity ratio of more than 75% but not more than 97% and a specific surface area of at least 10,000 $m^2/g$, and has an oxide film 12 of tantalum pentoxide on its surface. An electrically conductive material 13 fills open cavities of the metal and covers a surface of the oxide film 12. The conductive material 13 filling the cavities is mutually connected (not shown).

Figure 2:
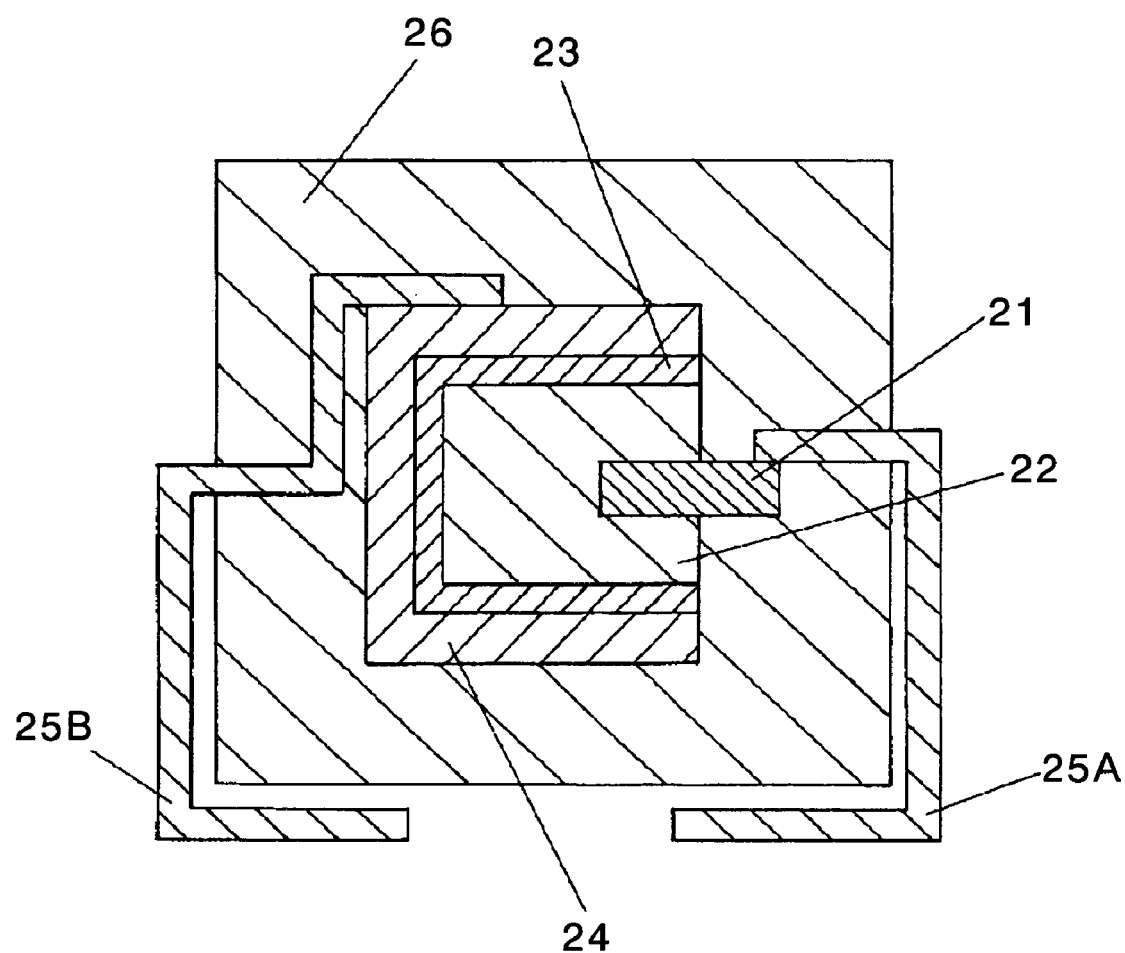
FIG. 2 is a cross-sectional view of a capacitor in accordance with the first and the second exemplary embodiment of the present invention.
Figure 3:
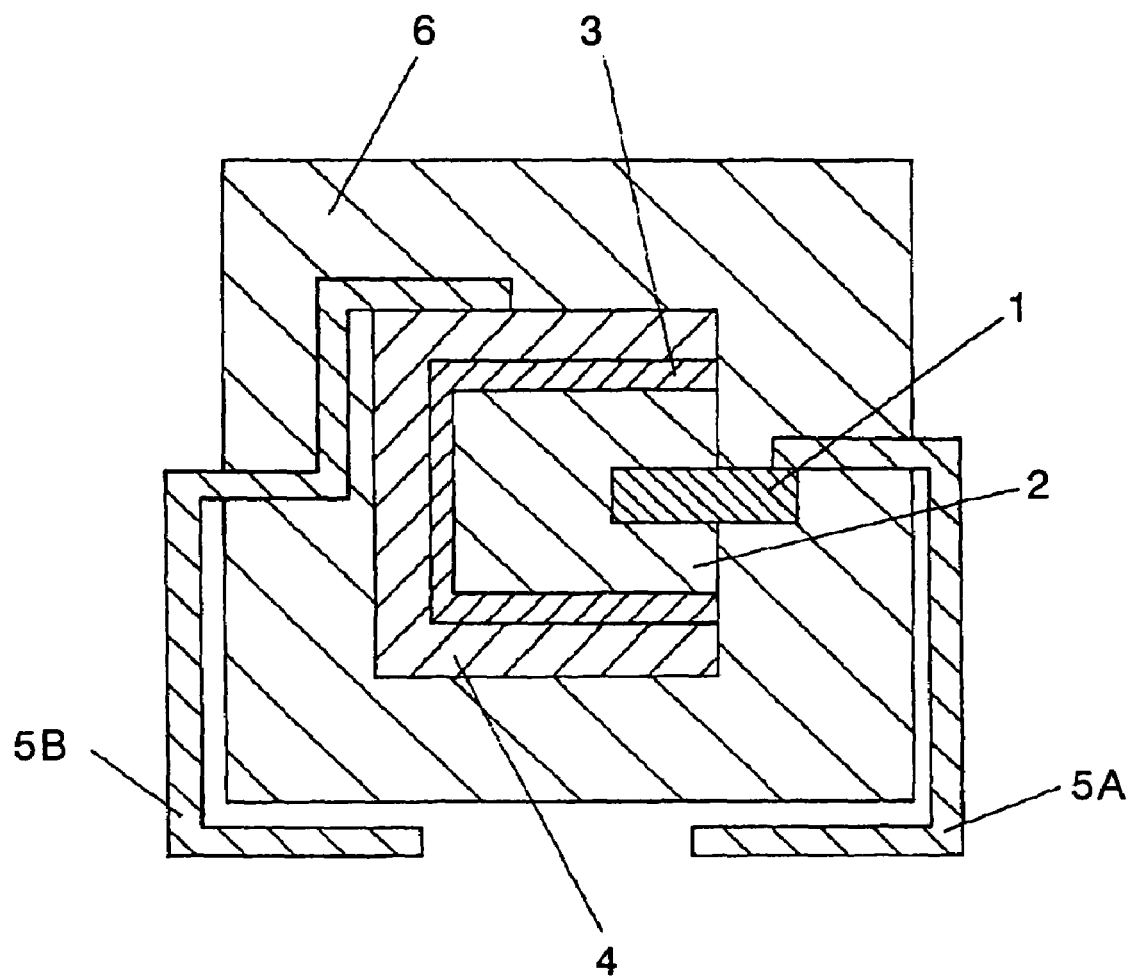
FIG. 3 is a cross-sectional view of a conventional capacitor.

FIG. 2 is a cross-sectional view of a capacitor produced by the porous body illustrated in FIG. 1. A sintered body (a porous body) 22 produced by sintering a mass of molded tantalum powder is joined with a tantalum lead wire 21. A graphite layer 23 is formed on a surface of the sintered body 22, and a silver layer 24 is formed on an outer surface the graphite layer. An electrode 25A is connected to the tantalum lead wire 21, and an electrode 25B is connected to the silver layer 24. An electrode body fabricated in this manner is covered with a resin package 26.

A manufacturing method of this capacitor is described below.

First, mix following materials to produce slurry;

1) tantalum powder of 30–80 weight % (wt %) and of an average particle diameter of 0.5–100 µm, 2) water-soluble binder of 2–10 wt % such as ethyl cellulose, 3) foaming agent of 0.5–5 wt % and of a 5–8 C hydrocarbon organic solvent or the like, 4) anionic surfactant or nonionic surfactant of 0.5–3 wt %, 5) plasticizer of 2–10 wt % such as polyvinyl alcohol, and 6) a solvent such as water;

and maintain a slurry viscosity of 3,000–55,000 cps at 20° C.

Next, form a sheet of the slurry of a desired thickness on a mold release layer of a carrier-film using a doctor blade method.

Then, maintain the sheet at 25–40° C. and at least 80% humidity, thereby preventing a surface thereof from being cracked, and evaporating the foaming agent to form bubbles.

Then, cohere the slurry at a boundary between the bubbles by heating and drying the sheet at 40–80° C.

Then, separate the sheet from the carrier film and cut it into a desired shape and size, degrease this cut sheet and sinter it. Degreasing and sintering under lower oxygen partial pressure than equilibrium oxygen partial pressure of the tantalum is desirable.

The sheet after sintering is the sintered metal 11 with a skeleton of a solid construction of 75.5% open porosity ratio and the specific surface area of 10,000 m$^2$/g. Then, etch a surface of the metal 11 to further increase its surface area.

Next, produce the oxide film 12 of tantalum pentoxide on the surface of the sintered metal 11, by electro-chemically anode-oxidizing the metal 11 in a phosphoric acid solution. Then, fill cavities of the sintered metal 11 (the surface of the oxide film 12) with manganese dioxide, i.e., a solid electrolyte (an electrically conductive material) 13, which is hereafter called a porous body 22.

Then, wind the sheet of the porous body 22 around the tantalum lead wire 21 while compressing the sheet, and make a desired shape and size. At this time, electrically connect the sintered metal 11 composing the porous body 22 with the tantalum lead wire 21 by destroying an area of connection of the oxide film 12 mechanically or with much electricity and welding the metal 11 and the wire 21 together, for example. In case the oxide film 12 is damaged at a boundary of the connection, reformation of the film 12 by an electrochemical method is desirable.

Next, apply a graphite paste to an outer surface of the porous body 22, and dry to form the graphite layer 23. Successively, apply a silver paste to the layer and dry to form the silver layer 24. Connect the electrode 25A to the tantalum lead wire 21, connect the electrode 25B to the silver layer 24, and cover this structure with the resin package 26 to finally obtain the capacitor as illustrated in FIG. 2.

Because the sintered metal 11 of this capacitor has the high open porosity ratio in itself, it allows the oxide film to have a larger specific surface area, thereby allowing the capacitor to have a large capacity. Furthermore, because the sintered metal 11 is cut into the desired shape and size after the cavities are filled with the conductive material 13, the cavities are effectively filled with the conductive material 13. Still furthermore, because the sheet is compressed when it is cut into the desired shape and size, a specific surface area of the oxide film 12 is enlarged, thereby causing the capacitor to easily have a larger capacity.

Second Exemplary Embodiment

A second exemplary embodiment differs from the first exemplary embodiment in an open porosity ratio of a sintered metal 11 and in an electrically conductive material 13. More specifically, in the second exemplary embodiment, composition, bubbling conditions and the like for making slurry are controlled so as to obtain an open porosity ratio of 97%. Polypyrrole, i.e., a conductive polymer, is used for the electrically conductive material 13. The polypyrrole is filled as described below. Immerse the sintered metal 11 coated with an oxide film 12 in a methanol solution of ferric dodecylbennzenesulfonate. Remove this body from the solution and dry it, and then successively immerse the body in pyrrole solution. After that, remove the body from the solution and dry it again. With this chemical oxide polymerization, the polypyrrlole, i.e., a conductive polymer is filled into cavities of the sintered metal 11. Immersing the sintered metal 11 in the methanol solution and in the pyrrole solution in a vacuum or in a pressurized atmosphere helps liquid penetrate easily into the sintered metal 11, and improves a filling efficiency of the conductive material 13.

Afterwards, by performing the same method used in the first exemplary embodiment, a capacitor illustrated in FIG. 2 is obtained.

A capacitor with a large capacity is obtained in the second exemplary embodiment as in the first exemplary embodiment. In the second exemplary embodiment, the sintered metal 11 coated with the oxide film 12 is immersed in the electrically conductive polymer solution so as to allow the conductive material 13 to be easily filled into the cavities. This method allows the conductive material 13 to cover a surface of the oxide film 12 easier than in the first exemplary embodiment, so that a large capacity for the capacitor is ensured.

Moreover, because an electrical conductivity of the material 13 is higher than that of the manganese dioxide, the capacitor is given a lower resistance and faster response to high frequencies than that of the first exemplary embodiment.

In the first and the second exemplary embodiments, the sintered metal 11 made of the tantalum which has the open porosity ratio of 75%–97% and the specific surface area of at least 10,000 m$^2$/g is used. The higher the specific surface area becomes, the larger the surface area of the oxide film 12 becomes, so a larger capacity is available. Therefore, it is more desirable to provide the open porosity ratio of 90%–97%.

However, if the porosity ratio exceeds 97%, a metal density decreases and an electrostatic capacitance per unit volume is possibly reduced. From a point of view of the surface area, it is desirable to compress the porous body 22 for enlarging the specific surface area of the oxide film 12 when the porous body 22 is wound around the tantalum lead wire 21. A porous body 22 without compressing is allowed; however, it is desirable to maintain the open porosity ratio of 75%–97% in any case.

The capacitor is similarly composed as long as the sintered metal 11 is composed of one or more of aluminum, niobium, titanium, hafnium, zirconium, zinc, tungsten, bismuth and antimony, as well as tantalum.

In addition, because the sintered metal 11 is cancellous and has a skeleton of a solid construction, the sintered metal 11 is so strong that the capacitor is allowed to have a high strength against impact.

Material, such as a solid electrolyte of the manganese dioxide, the conductive polymer such as the polypyrrole or a polyethylene-dioxythiophene, increases a contact area between the porous body 22 and the graphite layer 23. Thus, an equivalent resistance between the porous body 22 and the electrode 25B decreases, so that a capacitor having a large capacity and a high-quality is obtained.

Moreover, because the surface area of the sintered metal 11 is further expanded by etching, the surface area of the oxide film 12 is also expanded, so that capacity is enlarged therewith.

Still more, the present invention is not limited to the composition described in above exemplary embodiments. As long as the capacitor is composed of the sintered metal 11 serving as an anode, the oxide film 12, which is deposited on the surface of the metal 11 and serves as a dielectric layer, and a metal, which is formed on the surface of the oxide film 12 via the conductive material 13 and serves as the cathode, a capacitor with large capacity can be similarly obtained.

The high-capacitance capacitor can also be obtained by using a tantalum foil instead of the tantalum lead wire 21; namely, by compressing and bonding the sheet of the sintered metal 11 on both sides of the tantalum foil.

INDUSTRIAL APPLICABILITY

The present invention provides a capacitor with large capacity, by employing a sintered metal having a porosity ratio of 75–97% as an anode and depositing an oxide film onto a surface of the metal.

The invention claimed is:

1. A capacitor comprising:
   a sintered metal made from a foam metal, having a skeleton of a solid construction with an open porosity ratio of at least 80% and not more than 97%, and having an oxide film on a surface thereof; and
   an electrically conductive material formed on a surface of said oxide film.

2. The capacitor according to claim 1, wherein a specific surface area of said sintered metal is at least 10,000 $m^2/g$.

3. The capacitor according to claim 1, wherein said sintered metal includes at least one of aluminum, tantalum, niobium, titanium, hafnium, zirconium, zinc, tungsten, bismuth, and antimony.

4. The capacitor according to claim 1, wherein said electrically conductive material is a solid electrolyte.

5. The capacitor according to claim 1, wherein said electrically conductive material is an electrically conductive polymer.

6. The capacitor according to claim 2, wherein said sintered metal includes at least one of aluminum, tantalum, niobium, titanium, hafnium, zirconium, zinc, tungsten, bismuth, and antimony.

7. The capacitor according to claim 6, wherein said electrically conductive material is a solid electrolyte.

8. The capacitor according to claim 6, wherein said electrically conductive material is an electrically conductive polymer.

9. The capacitor according to claim 2, wherein said electrically conductive material is a solid electrolyte.

10. The capacitor according to claim 2, wherein said electrically conductive material is an electrically conductive polymer.

11. The capacitor according to claim 1, wherein said open porosity ratio is at least 90%.

12. The capacitor according to claim 11, wherein a specific surface area of said sintered metal is at least 10,000 $m^2/g$.

13. The capacitor according to claim 12, wherein said sintered metal includes at least one of aluminum, tantalum, niobium, titanium, hafnium, zirconium, zinc, tungsten, bismuth, and antimony.

14. The capacitor according to claim 13, wherein said electrically conductive material is an electrically conductive polymer.

15. The capacitor according to claim 13, wherein said electrically conductive material is a solid electrolyte.

16. The capacitor according to claim 12, wherein said electrically conductive material is an electrically conductive polymer.

17. The capacitor according to claim 12, wherein said electrically conductive material is a solid electrolyte.

18. The capacitor according to claim 11, wherein said sintered metal includes at least one of aluminum, tantalum, niobium, titanium, hafnium, zirconium, zinc, tungsten, bismuth, and antimony.

19. The capacitor according to claim 11, wherein said electrically conductive material is a solid electrolyte.

20. The capacitor according to claim 11, wherein said electrically conductive material is an electrically conductive polymer.

* * * * *